United States Patent

[11] 3,581,565

| [72] | Inventor | Peter D. Dieterich<br>2927 Summit Drive, Michigan City, Ind. 46360 |
|---|---|---|
| [21] | Appl. No. | 744,800 |
| [22] | Filed | July 15, 1968 |
| [45] | Patented | June 1, 1971 |

[54] FLOW-MEASURING DEVICE
16 Claims, 10 Drawing Figs.

| [52] | U.S. Cl. | 73/212 |
|---|---|---|
| [51] | Int. Cl. | G01p 5/16 |
| [50] | Field of Search | 73/212 |

[56] References Cited
UNITED STATES PATENTS

| 314,323 | 3/1885 | Flad | 73/212 |
|---|---|---|---|
| 1,119,581 | 12/1914 | Dodge | 73/212 |
| 1,255,622 | 2/1918 | McFarland | 73/212 |
| 3,382,715 | 5/1968 | Larkham et al. | 73/212 |

Primary Examiner—Richard C. Queisser
Assistant Examiner—John K. Lunsford
Attorney—Silverman & Cass ABSTRACT: A device for measuring fluid flow in a pipe as a function of fluid pressure and having a slidable and/or rotatable impact probe, a static fluid pressure probe at a fixed distance downstream of the impact probe and a pressure differential responsive device connected therebetween exterior of the pipe to provide a measurement representative of fluid flow rate; the impact probe preferably including a blind ended outer conduit extending diametrically across the pipe and having a plurality of laterally spaced openings facing the flow and an inner conduit extending to the axial center of the outer conduit from one end thereof and having a lipped side opening adjacent the inner end thereof and providing the sole communication to the differential pressure-responsive device; said element capable of bodily removal from and/or return to the installed condition in the pipe while fluid pressure is maintained and having indicating means exterior of the pipe to assure proper operative orientation and indicate same.

INVENTOR
PETER D. DIETERICH
BY
Silverman & Cass
ATTYS.

FLOW-MEASURING DEVICE

FIELD OF THE INVENTION

This invention relates generally to the measuring of fluid flow within closed pipe systems and, more particularly, is concerned with the provision of an improved Pitot tube-type flow-measuring device having a pair of spaced probes, one independently movable relative the other and insertable into the flow stream, and capable of being connected to differential pressure-measuring means for measuring flow as a function of the velocity caused pressure differential within said probes, one of said probes being positioned to receive the impact of the fluid flow and being rotatable and/or slidable and/or withdrawable from the device independently of the other probe.

DESCRIPTION OF THE PRIOR ART

Monitoring of the flow of fluids in closed conduit systems can be accomplished in many well-known ways. One of the most widely accepted methods utilized the measurement of the pressure differential resulting from the interception of the flow stream by a plate or other means carrying an orifice exposed to the impact of the fluid stream. The pressure measured at the vicinity of the orifice will differ from the normal fluid pressure as measured downstream and that pressure difference is a function directly of fluid velocity or rate of flow. So-called orifice plates block the flow of fluid except through the orifice carried thereby. In those devices, the location of the orifice is not critical. However, in many flow-metering devices, such as those of the Pitot tube type, flow proceeds around the tube. The velocity of the fluid flow significantly varies at different locations of the conduit cross section so that careful selection of the representative location of the orifice carried by the tube is essential. In some prior devices, the tube carrying the orifice is movable to different portions of the flow pattern or profile, successive readings of the pressure taken, the results averaged and the flow rate calculated.

The restriction of the flow stream is a serious source of error in addition to the substantial expenditures incurred in installation of past systems. Special flanges, multiple runs, repeated calibration and other installation and maintenance problems are required in the use of presently available orifice plates or other like purpose flow-measuring devices such as venturi tubes, target meters. Additionally, the presently available elements for flow-measuring devices are designed individually for a particular type of fluid to be measured, a particular set of flow conditions and/or individual flow systems. Therefore, changes in the conditions or systems require substantial expenditures to be incurred in changing elements or redesigning the elements to meet such changing conditions and/or systems.

Other disadvantages of conventional metering systems include the requirements of precisely dimensioned orifices or contoured surfaces which are subject to attack and change due to chemical corrosion, physical erosion, scale deposits, all resulting in loss of original accuracy over a relatively short period of use. Thus, the useful life of present devices in the field is undesirably shortened.

Requirements for accurate and versatile flow-measuring devices also characterized by ease and simplicity of installation are increasing with presently available devices being incapable of meeting same. Such flow devices are found mandatory in nearly every processing industry as well as a great number of processing application. There has been a long-standing need for a flow-measuring device versatile for use in such varied critical flow applications as viscose, nonviscous liquids, air, saturated or superheated steam, transport of gases, slurries or raw sewage using purging or backflush systems, air conditioning, heating, fuel feeding systems, fluid distribution, as well as many others. In most of such applications, the provision of flow metering which can be easily installed and maintained yet with minimal loss in accuracy as a result thereof would generate manifold savings to the user in reduction of downtime, as well as savings directly due to ease of installation and maintenance without loss in accuracy.

Prior art Pitot tube devices used for flow measurement generally comprise a pair of opening elements formed in a single probe or tube. One opening element is formed in the sidewall thereof and is exposed tp the impact of the fluid stream when the probe is inserted in the pipe. A second opening is formed opposite the first opening and, when the probe is inserted in the flow stream, faces downstream. Tubes with plural opposite openings have been provided, generally feeding into separate chambers of the single probe and communicating independently to a pressure differential measuring means. There will be a differential pressure measured as between the interior pressures of the impact and static probes which is related directly to flow velocity, the key monitorable characteristic determined by flow-metering devices.

In the prior Pitot tube-type devices, the impact chamber measurement is a weighted averaging of the various pressures generated at the respective impact openings. It is well known that different concentric portions of flow profile contain fluid moving at different relative velocities. Thus, efforts to determine the proper locations for "tapping" the flow stream to provide a true measured value have been widespread. The consensus of the art has been to utilize a plurality of similar configured openings spaced selectively along the length of a tube, and place said tube across the flow stream so that the respective openings are located in particular portions of the flow stream. The internal pressure within the "impact" tube chamber would then be an average of the individual pressures generated at the respective openings and an average result should be obtained, however, although averaging is attempted, a true average has not been obtained.

Some solutions offered by the art involve the presumptive division of the flow stream into concentric sections and the location of the impact openings at selected locations within the bounds of each concentric area taken along a line diametrically extending transverse the flow stream. Errors here resulted from the failure to consider the different weights of the pressure readings dependent upon the distance of the particular opening from the pressure-measuring instrument. Also, difficulties have been encountered where turbulence has occurred within the pipe section with the errors being noncorrectable.

While compared to the cost of installing and maintaining the orifice plate-type flow-measuring device, the relatively simple Pitot tube devices heretofore known did reduce said costs appreciable. Nevertheless, inaccuracy of those type prior devices due to many causes sharply limited their usefulness and application to those monitoring applications requiring less sensitivity and accuracy.

Clogging of the impact orifices continued to be a considerable problem often requiring downtime of the fluid system to correct since purging by fluid back pressure often failed to dislodge debris from the clogged openings. Accordingly, the probes required actual removable from the system and manual clearing. Additionally, the probes were constantly in intercepting condition within the stream of flow, and hence, always subject to the corrosive and wearing effects thereof. The prior probes were incapable of being removed from the stream without either complex valving or dismantling therefrom. Prior Pitot tube devices could not be deactivated to take the impact openings from the fluid stream without exposing the static opening to fluid impact. Thus, the impact openings were often continually exposed to the impact of fluid resulting in a susceptability to clogging and wear with much reduction in useful life. Some prior probes could be moved out of the flowing stream but none have been available wherein movement more than 90° to place the impact openings out of the flow stream does not expose the static opening to the impact of said stream.

Another particular disadvantage of prior devices was encountered where unskilled or semiskilled artisans were involved with their installation. A critical factor in the proper placement of the probes has been the correct positioning of the respective impact and static openings relative the flowing stream and particularly relative the direction of flow of such stream. Means to enable the unskilled or semiskilled artisan to ascertain the direction of flow as well as the proper position within the conduit to place the probe were not provided on prior devices. Thus, ordinarily one completely familiar with the overall flow system was required. Changing of the flow system required general reevaluation and replacement of flow elements. Since many of the flow elements were permanently installed, new conduits had to be installed in the flow system replacing sections carrying old flow elements. Also, change in flow systems, contents and/or conditions required new elements and major overhaul. As stated earlier, versatility was not a characteristic of prior flow-measuring elements and devices. The art failed to provide a Pitot tube-type fluid flow-measuring device a pair of probes spaced one from the other and wherein the impact probe thereof was rotatable, slidable, withdrawable and/or replaceable independent of the static probe.

ABSTRACT OF THE INVENTION

The invention provides a flow-measuring device of the Pitot tube type comprising a total pressure-measuring or impact probe engageable within the pipe carrying a fluid, a static measuring probe nonrotatably engaged within the pipe and having a static opening therein facing downstream of the impact probe, means for connection of a differential pressure-responsive apparatus between the probes and exterior of the pipe, said impact probe having a fixed axial alignment relative to the static probe and further being independently but sealingly rotatable, slidable, withdrawable and removable relative the static probe respectively for selective deactivation, independent installation, cleaning and/or replacement thereof.

The invention further is characterized by the provision of an impact probe comprising a first hollow conduit disposed in the pipe diametrically transverse of the normal fluid flow in the pipe with a free internally blind end thereof terminating adjacent the inner wall of the pipe, said first hollow conduit having an opposite dead end disposed exterior of the pipe, said first hollow conduit having a plurality of spaced lateral openings formed therein along the length thereof in that portion of the said conduit within the pipe and facing the impact of the fluid flow within the pipe thereby providing communication between the pipe and the interior of the first conduit and a second hollow conduit having an open end terminating substantially at the center of the flowing stream within the pipe and having communication with the interior of the first conduit and including means to establish communication to the differential pressure-responsive means exterior of the pipe.

The invention also provides indicating means associated with the probes located exterior to the pipe for properly positioning the probes within the pipe and relative to the axis thereof; means for indicating the relative position of the probes and the openings thereof one relative to the other; a pipe section carrying both impact and static probes installed thereupon for insertion as a link within an established fluid flow system; centering means installable on the pipe diametrically opposite the impact probe for use in maintaining the position of said openings relative to the flowing stream against disturbance by the pressure of the flowing fluid, and, a valving arrangement as a part of the mounting assembly means to permit withdrawal of the device from the pipe with maintenance of fluid flow within the system.

Other characteristics and advantages and objects of this invention will become evident to one skilled in the art as a detailed description of several embodiments of the invention is set forth hereinafter with reference to the accompanying drawings:

DESCRIPTION OF THE PREFERRED EMBODIMENT

The invention solves the problems encountered in use of the prior art devices for measuring the flow of fluids in a pipe or conduit system and provides additional advantages of accuracy, precision, ease and versatility of use and installation and maintenance in the form of a flow-measuring device comprising a pair of probe elements inserted through the sidewall of the pipe, one facing upstream and the other, facing downstream. The upstream element, hereinafter called the impact probe, is spaced form and independently movable relative to the downstream element, hereinafter called the static probe. The impact probe is a hollow conduit having a plurality of spaced lateral openings in a row along the length thereof. The location of said spaced openings being selected at predetermined centers of concentric sections of the flow of the fluid within the pipe. The said hollow conduit extends diametrically across the pipe to terminate immediately adjacent the inner wall thereof. Communication to the exterior of the pipe is afforded by the provision of an averaging or interpolating tube within the outer conduit, terminating substantially at the center of the pipe. This interpolating tube has an end, lipped opening disposed at the center of the pipe end nonaligned with the openings carried by the outer conduit. The other end of the interpolating tube communicates with a differential pressure-responsive means.

The static element is a tube terminating at the center of the pipe in an opening facing downstream. The other end of the static element tube communicates with the differential pressure-responsive means. The measurement of the differential pressure between the interiors of the impact and static probe elements is directly related to the velocity of the fluid flow within the pipe. The interpolating tube within the impact probe element assures a true average reading of pressure independent of the distance of each impact opening from the differential pressure-responsive means and, as well, independent of turbulence or other flow effects within the pipe. The device according to the invention can advantageously be utilized at many locations in the flow system where other prior means could not be installed, such as close to elbows, taps or the like.

Other important features of the invention to be described herein are:

The entire apparatus may be inserted into a pipe by means of a threaded bushing fitting in an opening formed in the pipe and welded to the pipe; provision of a balancing tube within the impact probe element, the balancing tube being of size and configuration sufficient to displace an interior volume substantially equal to the volume displaced by the interpolating tube; a lip at terminal opening of the interpolating tube to permit rodding to clear debris, if any; the location of the lateral openings in the outer conduit of the impact probe at locations relative to the pipe interior in the approximate centers of concentric annuli; preferably of equal area; the provision of means whereby the probes may be withdrawn from the pipe while flow of fluid is maintained; and the provision of means whereby the impact probe may be simply and effectively temporarily deactivated to prevent debris entrapment and clogging the lateral openings thereof when measurements are not required. The impact tube is slidable relative to the static tube to enable selective withdrawal thereof from the device without requiring dismantling of the device from the pipe, thereby to permit cleaning and/or replacement of said impact tube.

Figures 1, 2, 3:
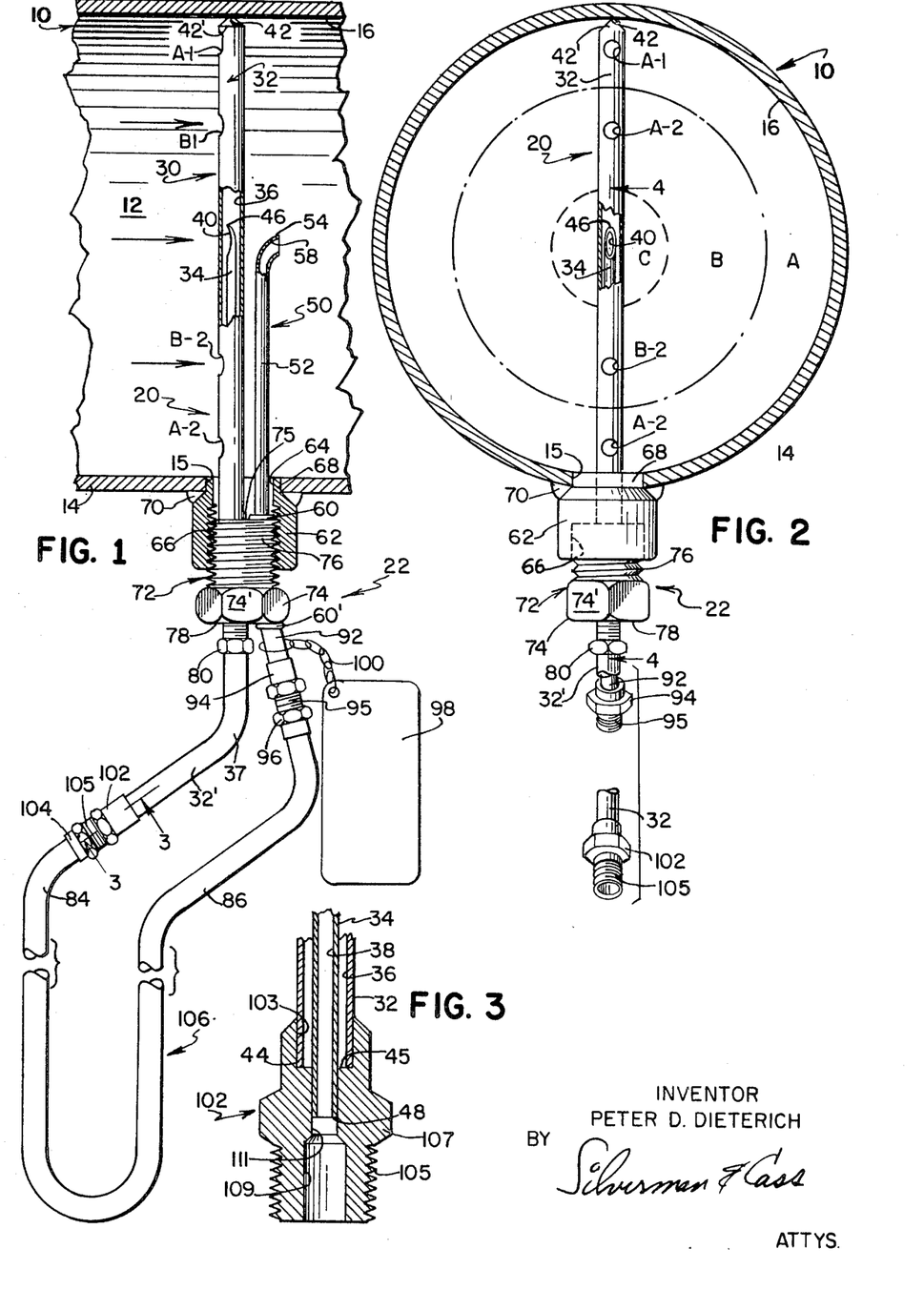
FIG. 1 is a fragmentary sectional view of a fluid-carrying conduit or pipe in which the fluid flow-measuring device according to the invention has been installed, only selected portions of which are shown in section to illustrate interior detail.
FIG. 2 is a fragmentary end view of the pipe shown in FIG. 1 with portions of the flow-measuring device shown in section to illustrate interior detail.
FIG. 3 is a sectional view taken along lines 3-3 of FIG. 1 and in the direction indicated.

Referring now to the drawings, FIG. 1 illustrates a portion 10 of a pipe system wherein a fluid 12 flows in the direction of the arrows, from left to right as viewed in FIG. 1. The flow device according to the invention is generally represented by reference character 20 and is shown installed through an opening 15 formed in the wall 14 of the pipe portion 10. One element of the device 20 extends across the stream of fluid 12 diametrically transverse the pipe 10 and terminates at the inner wall 16 thereof. The other element terminates at the center of the pipe 10.

The device 20 is of the Pitot tube type and comprises an impact probe 30 and a static probe 50. The impact probe 30 has a hollow outer body 32, hereinafter described as a buffer tube. The buffer tube 32 has a free end 42 carrying plug 42' to close off said tube 32 thereat. Tube 32 extends tightly but slidable through a mounting assembly 22, the other end 44 terminating seated in the socket 103 of dead-end coupling 102 (FIG. 3). The interior chamber 36 defined between the pair of ends 42 and 44 does not communicate with the device 106 exterior of the pipe 10. The tube 32' has an angular bend 37 for reasons to be described hereinafter. The tube 32 is provided with a plurality of lateral openings designated A-1, A-2, B-1 and B-2 at selected locations disposed across the stream of fluid 12. An interpolating or averaging tube 34 is disposed interior of the buffer tube 32. The tube 34 has a lipped free end 46 terminating adjacent the center of the pipe 10 and an opposite open end 48.

The static probe 50 comprises a hollow tube 52 having an arcuate bent free end 54 disposed substantially at the center of the pipe 10, the static opening of tube 52 having a a common axis with the pipe 10 and facing downstream of the flowing fluid 12. The other end of tube 52 terminates frictionally engaged in the inner bore 110 of plug 72 of mounting assembly 22 opening to the tapered interior passage 56 to communicate through narrow diameter bore 86. Bore 86 opens to chamber 88 and thence to feed-conduit 92 disposed frictionally engaged in angled passageway 90.

The probes 30 and 50 are arranged with their axes parallel one to the other; therefore, the axes of the respective passageways formed in the mounting assembly 22 likewise are parallel. The impact probe 30 is movable both slidable and rotatably relative to the mounting assembly 22 while the static probe 50 has a fixed relationship to said mounting assembly, being permanently secured thereto as by solder connection 60. Tube 92 is fixed in place by solder connection 60'. Thus, tube 32 may be removed from the mounting assembly for cleaning and/or replacement.

Generally, the fluid pressures along the flow profile of a flowing fluid stream within a pipe vary with the different annular areas. Flow velocity adjacent the inner wall 16 generally is less than the flow velocity at the center of the pipe 10 usually due to friction at the wall. The principle upon which this invention, and other Pitot tube structures operate, assumes that if an opening or orifice is placed in a flow stream so as to permit its impact thereagainst, there is a pressure developed on the opposite side proportional to the velocity of flow and additional to the static pressure. If this pressure is measured and compared with the static fluid pressure of the fluid measured downstream, the resulting measured pressure differential will be a true and accurate indication of the flow rate of the fluid within the pipe.

Where different velocities are encountered along the flow profile, the provision of a hollow conduit carrying a plurality of openings and positioned to receive the impact of fluid at selected locations along the flow profile will result in the establishment of a pressure head within the impact probe due to the velocity of the fluid at each orifice and the resultant approaches the average of all the individual pressures occurring within the chamber 36 of the probe 30. The accuracy of the relationship between the measured pressure differential and the true average velocity of the fluid over the entire length of the transverse width of the profile suffers when one considers that the individual velocities as ordinarily measured are different depending primarily upon the distance of the openings to the differential pressure-responsive means utilized. The pressure developed at the opening furthest from the measuring means will not contribute its proper weight to a true relationship to the average as compared to the weight given the measured pressures developed by those openings to chamber 36 closest to the said means, here manometer 106. While prior Pitot tube-type devices sought to provide a measurement which was a true average, none is believed to achieve such result.

Accordingly, and to overcome the said variations and provide a true average, the invention provides an interpolating tube or averaging tube 34 disposed within the buffer tube 32 and placing the side opening 40 thereof at the axial center of the pipe; the only communication to the manometer 106 from probe 30 being through interpolating tube 34.

Differences encountered in flow velocity and hence pressure along the flow profile of fluid 12 within pipe 10 is recognized according to the invention by dividing the interior area of the pipe 10 into concentric areas, A and B, preferably of equal area and placing the openings in the buffer tube 32 generally at the radial centers thereof. Thus, openings A-1 and A-2 are located along the length of the buffer tube 32 of impact probe 30 so that they are in the radial centers of area "A" while the inner openings, B-1 and B-2 are located spaced from openings A-1 and A-2. The innermost area "C" need not be provided with a probe opening communicating therewith, and in fact, such opening is omitted since the opening 40 of interpolating tube is positioned to be at the axial center of the pipe 10 within tube 32. All openings A-!1, A-2, B-1 and B-2 originally should have a common configuration and size, although wearing of their surrounding edges during use may result in some nonuniformity. In view of the presence of interpolating tube 34, such nonuniformities will have little, if any, effect on the accuracy of the pressure measurements and their relationship to flow being monitored.

Figures 4, 5, 10:
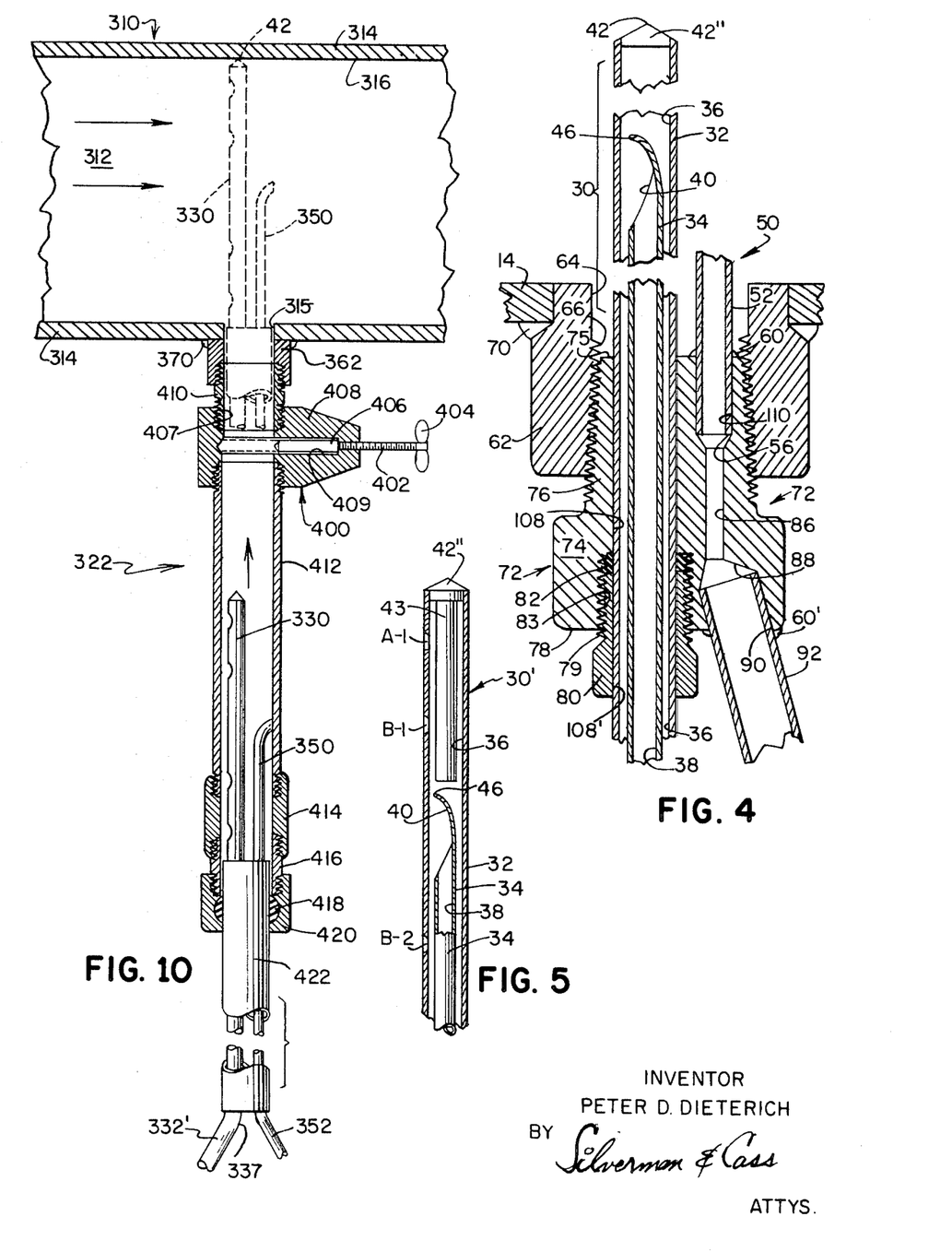
FIG. 4 is an enlarged sectional view taken along lines 4-4 of FIG. 2 and in the direction indicated.
FIG. 5 is a fragmentary section of the impact probe of a modified embodiment of the invention.
FIG. 10 is a fragmentary sectional view of a fluid-carrying conduit illustrating in partial section yet another modified embodiment of the invention installed therein, same being particularly useful when withdrawal of the probe from intercepting position within the pipe is desired during continued flow of the fluid therein.

The mounting assembly 22 comprises a coupling bushing 62 having a through axial passage 64, a portion 66 of which is threaded. A narrow diameter, annular rim 68 is provided at one end of the bushing surrounding the inner opening of the passage 64. The outer diameter of rim 64 is like the inner diameter of opening 15 in wall 16 so that rim 64 can be tightly received therein. A plug 72 having an hexagonal head 74, and opposite inner and outer surfaces 75 and 78 and an exterior threaded nipple portion 76 which is engaged within the threaded portion 66 of passageway 64. The hexagonal head 74 has a flat surface 78 which carries indicia 71 provided by molding, casting, etching or other well-known methods. The head 74 is formed of opposite pair of parallel flat side surfaces 74' so that the alignment of the probes properly perpendicular to the longitudinal axis of the pipe 10 is possible through the use of a simple level instrument and by a relatively unskilled tradesman.

Figures 6, 7, 8, 9:
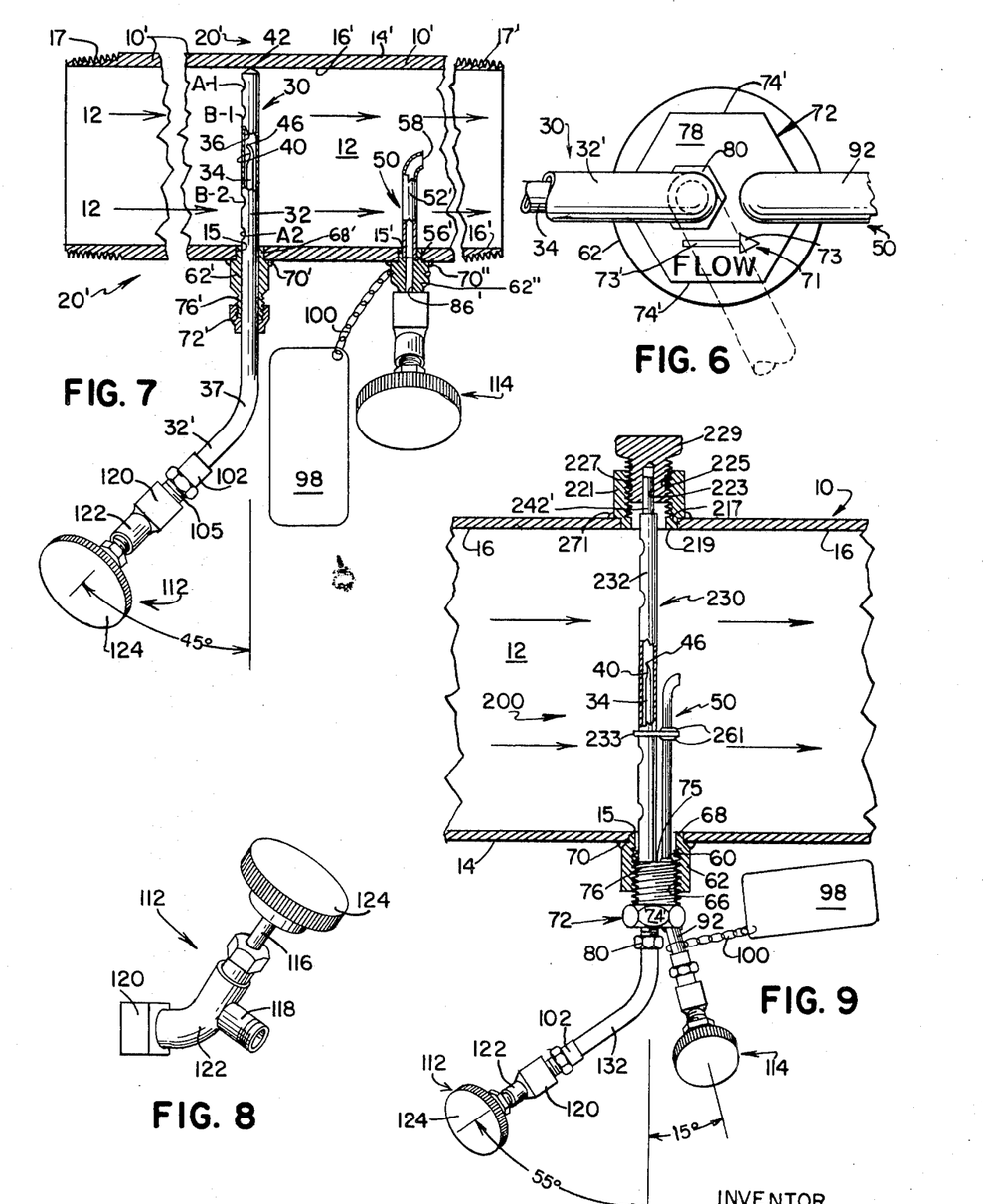
FIG. 6 is a fragmentary plan view of the mounting assembly means of the flow-measuring device shown in FIG. 2 to illustrate the provision of means for assuring proper installation on, and positioning of the flow-measuring device relative to, the pipe and the pair of probes one relative the other.
FIG. 7 is a fragmentary sectional view of a modified embodiment of the fluid-measuring device according to the invention.
FIG. 8 is a detail of the valve coupling capable of utilization with the invention for quick release connection of the probes to a differential pressure responsive means.
FIG. 9 is a fragmentary sectional view of a fluid-carrying conduit illustrating in partial section another modified embodiment of the invention installed therein, same being particularly useful for large diameter fluid conduits and/or for higher pressure fluid systems.

Indicia 71 principally consists either of a depressed portion or a raised portion formed in the configuration of an arrow. The arrow head 73 points in the direction of flow of fluid 12 when the impact probe 30 properly is installed; the tail 73', in proper orientation of the probe 30 being parallel to the axis of the pipe 10 and normal to the axis of the buffer tube 32. The word "flow" may be included as shown in FIG. 6.

The plug 72 is provided with a pair of passageways 108 and 86 disposed axially parallel one to the other. Passageway 108 has a diameter substantially the same as the outer diameter of buffer tube 32 and opens at one end to surface 75 and at the other opposite end, to coaxial threaded socket 83. The threaded socket 83 is of a size and configuration to receive the threaded portion 79 of coupling bushing 80. A compression gland 82 is positioned at the base of socket 83 so that tube 32 is slidable and rotatable in passageway 108 while a seal to the extension is provided with an axial passageway 108' of the same diameter as axial passageway 108 of plug 72, with the tube 32 passing entirely therethrough.

Passageway 86 of plug 72 has a narrow diameter and opens to coaxial socket 110, which in turn opens to the inner end surface 75. Socket 110 is of a size and configuration tightly to receive the other end 56 of static probe tube 52. The other end of passageway 86 opens into an angular chamber 88 which, in turn, opens by way of mouth 90 to outer surface 78 of plug 72. Static feed-conduit 92 is received tightly in chamber 88 and extends outward thereof for communication through appropriate couplings to the pressure differential responsive means 106.

The installation of the flow device 20 into the stream of fluid 12 proceeds as follows; an opening 15 is formed in the pipe wall 14. The bushing 62 of mounting assembly 22 is fitted, with rim 68 thereof in opening 15. The bushing 62 is spot-welded temporarily to fix its position and alignment Probe 50 is assembled to bushing 72 and same is engaged within bushing 62. Through the use of a conventional bubble-type level instrument on surfaces 74' and use of the indicia 71 on surface 78, proper alignment of the probe relative to the axis of the pipe 10 and positioning of said probe 50 is set. Thereafter, the bushing 62 is then welded, as at 70, to the pipe portion 14. A solder connection may be used depending upon the pipe material. The impact probe 30 then is slidable engaged through the passageway 108 until the pointed tip of end 42 touches the inner wall 16 of pipe 10. With the tapered tip of end 42, the installer can determine when impact is made with said inner wall 16. Also, the provision of the tapered tip of end 42 renders the probe useful with various diameter pipe without surface-mating problems. One end 84 of manometer 106 is coupled by bushing 104 to threaded link portion 105 of dead-end coupling 102. Static feed-conduit 92 is coupled by means of bushing 94, link portion 95 and bushing 96 to the other end 86 of said manometer 106. If desired, a metal tag 98 can be provided, secured by chain 100 to conduit 92. Pertinent information concerning the probe and the system being monitored can be inscribed thereupon.

An important feature of the invention herein involves the independence of movement of probe 30 relative to the static probe 50. Now, as a result of such independence, the flow-measuring device 20 can be inactivated selectively simply by rotating the impact probe 30 through a 180° angle to position the lateral openings A-1, etc. thereof downstream. At this position, the lateral openings and the interior chambers 36 and 38 are not exposed to continued impact of the fluid thereby eliminating much clogging or debris entrance thereinto. Additionally, much wearing of the pipe 32 is reduced, increasing the useful life of the probe 30. In order to accomplish this rotation without interference or obstruction, the bend 37 is selected to be of an angle of between 45° to 55°. The angle at which conduit 92 extends relative the surface 78 is selected to be about 15°, also to facilitate the rotation of probe 30, particularly when both probes 30 and 50 are mounted in single plug 72.

In FIG. 1, the flow-measuring device 20 according to the invention is shown as installed directly in a pipe that is a part of the flow system being monitored with the probes installed in situ. Many systems can utilize better a flow measurement device wherein the probes thereof are preinstalled in a coupling which then is coupled bodily within the flow system, as between a pair of pipe ends thereof. Accordingly, the invention provides such a preinstalled device, generally designated by reference character 20' and illustrated in FIG. 7. The device 20' comprises an open-ended length of pipe coupling 10' having threaded ends 15' arranged to be engaged as a link between like threaded end portions of the pipes of a fluid flow system under study.

In device 20' illustrated in FIG. 7, the probes 30 and 50 are present but are mounted in suitable longitudinally spaced, preferably aligned openings 15 and 15' formed in the wall 14' of the coupling 10'. Probe 30 is mounted to the coupling 10' by means of a mounting means comprising bushing 62' having rim 68' engaged within opening 15. The bushing 72' is provided with only a single passage through which is slidably and sealingly engaged the tube 32 of probe 30. The bushing is secured to the pipe by weld 70', or may be soldered thereto.

The static probe 50 is installed spaced from the probe 30. In practice, it has been found that a center-to-center spacing of about 2¼ inches shows excellent results. The tube 52' is slightly shorter than tube 52 heretofore described since end 56' thereof is coupled directly to passage 86' formed in bushing 62" which in turn is directly secured in opening 15' by welding or solder connection 70".

Instead of leading through conduit means directly to the pressure differential measuring means 106, valve means 112 and 114 are interposed to provide quick-coupling means thereto, the said valve means being identical and illustrated in FIG. 8. Valve means 112 illustrated (FIG. 8) has a coupling box 120 for connection to dead-end bushing 102, a conduit 122 from which a threaded nipple 118 extends and a shaft plunger 116 secured to knob 124. Not shown, but well known, is a needle or similar gate means positioned at the inner end of plunger 116 to control the opening leading to conduit 118. Conduit 118 is arranged for quick coupling to any suitable differential pressure-responsive device. The tag 98 can be secured by means of chain 100 directly attached to bushing 62". Other features of device 20' which are identical to those of device 20 are indicated with the same reference characters as found in FIG. 1 and described heretofore.

In FIG. 9, a still further embodiment of the invention is illustrated particularly useful for wide-diameter pipe systems, or those where there is a substantial flow velocity or heavy fluid material is transported. The said device 200 is identical to the device 20 shown in FIG. 1 except the valve means being identical to valve means 112 and 114 described and illustrated in respect of FIG. 8.

The impact probe 230 differs from probe 30 in the provision of an extension 242' of end 242. An opening 217 is provided in the pipe wall 14 diametrically opposed to opening 15. However, the center of said opening 217 is offset slightly from the center of opening 15 to the extent that it is identical with the axis of tube 232 of impact probe 230. A bushing 221 having an annular rim 219 is engaged securely in opening 217 by solder connection 271. The bushing 221 has a threaded passageway 225 to receive the threaded end 227 of plug 229 therein. Plug 229 is provided with a passageway 223; both passageways 225 and 223 being coaxial one with the other and with the axis of tube 232. Passageway 223 is arranged to receive the extension 242' therein.

Closed end 242 of the impact tube 232 can be properly located by engagement of the extension 242' in the passage 223 and is maintained in such position uneffected by the fluid pressure. Additionally, brace means 233 may be provided for maintaining the relative positions of probes 230 and 50 against displacement or disarrangement by the fluid pressure. The static probe is permanently secured to said brace means 233 by solder connections 261. The other parts of the device 200 are similar to those of device 20 and carry the similar reference characters as identification.

There are occasions where the flow of fluid in the pipe system is not to be obstructed except when measurements are to be taken. Accordingly, the device according to the invention may be modified as illustrated in FIG. 10. Here, the coupling assembly 322 for the modified device 300 is provided with a selective gate arrangement whereby the probes 330 and 350 may be simultaneously withdrawn from the flow stream without drainage or reduction of static pressure in the pipe 310. The modified coupling means 322 comprises a bushing 362 secured to the pipe wall in the manner described heretofore. A gate arrangement 400 is provided including a housing 408 carrying a passageway 407 having opposite threaded ends. Threaded coupling 410 is engaged in one of said ends while elongate tube 412 is engaged in the opposite one of said ends. A passage 409 between a position cutting off communication through passage 407 (shown in broken outline) and a position clearing said passage. A threaded shaft 402 has one end connected to gate 406 and the other end connected to a handle 404 so that reciprocation of the gate is controlled.

The other end of conduit 412 connected to link 414 and thence by means of link 416 to 420 which contains compression gland 418. The pair of probes 330 and 350 are mounted to member 422 and are movable slidably as a unit to the operating position shown in broken lines in FIG. 10. When the probes are in operating position, the gate is withdrawn from the position blocking passage of passageway 407. For withdrawal of the probes to the full-line position shown in FIG. 10, the probes are withdrawn and the gate closed. In all other respects, the device 300 is substantially identical to device 20 previously described.

Where greater accuracy is desired, a modification illustrated in FIG. 5 can be utilized wherein a ballasting or balancing bar 43 can be inserted in the free end of the buffer tube 32 of probe 30 to equalize the unoccupied volume of the chamber 36 over its length. Balancing bar 43 is selected to occupy a volume within chamber 36 substantially equal to the volume displaced by the interpolating tube 34.

The provision of lip 46 on the interpolating tube 34 assures that the opening 40 functions as a side opening, while still permitting rodding to clear debris, if any. The exact positioning of the said opening 40 is not critical although direct exposure to the flow through the lateral openings A-1, etc., is not desired.

As described herein, it can be seen that the rotatable feature of the impact probe enables one to place the lateral openings thereof out of the impact of the flowing stream without exposing the static probe opening to such impact. The bend 37 of the tube 32 serves as indicating means to enable an instantaneous exterior visual appraisal of the position of the impact probe either in "on" or "off" condition. In "on" condition, the bend is in a plane parallel to the axis of the pipe 10 while in the "off" condition, the bend 37 is directed more than 90° of rotation from that parallel condition. Note the illustration thereof in phantom outline in FIG. 6.

The slidability feature of the impact probe according to the invention enables the facile and accurate installation and positioning of the impact probe within the pipe, and, as well, gives rise to the withdrawal of said probe independent of the static probe to permit removal thereof, either for cleaning or replacement, without dismantling of the device's installation, These features are particularly effective where the position of the static probe is fixed.

It should be understood that one can provide a flow-measuring device which is operative with advantage wherein the impact probe is rotatable, but absent the presence of the interpolating tube 34; and, as well, to provide some of the advantages of the invention in a flow-measuring device which incorporates the interpolating tube but is without the rotatable feature as applied to the impact probe.

Clearly, the invention teaches both the presence of a slidable and/or rotatable impact probe which incorporates the interpolating tube as the best mode of practicing the invention.

What I desire to be secured by Letters Patent of the U.S. is:

1. A flow-measuring device for use in connection with a pipe carrying a fluid and said device comprising:
    i. an impact probe having a plurality of spaced lateral openings formed along the length thereof and the probe being engaged through one pipe wall diametrically across the interior of the pipe carrying a fluid and capable of having generated therein an interior pressure having a component due to fluid velocity and a component due to static fluid pressure, said impact probe having a blind end contacting the opposite wall of the pipe, whereby to center the lateral openings symmetrically of the axis of said pipe,
    ii. a static probe engaged within the pipe and having a static opening therein,
    iii. means for connection of a differential pressure-responsive apparatus between said probes and exterior of the pipe, said probes having a fixed axial spaced alignment one relative the other and the pipe in installed condition and said impact probe being sealingly translatable relative to and independently of the pipe and said static probe to enable said engagement to be made.

2. The structure as claimed in claim 1 in which the impact probe comprises a first hollow conduit disposed in the pipe diametrically transverse of the normal flow of fluid in the pipe, said first hollow conduit having blind ends, one being said end contacting the inner wall of the pipe, said first hollow conduit having a plurality of spaced lateral openings formed therein along the length thereof in that portion of the conduit within the pipe and facing the impact of the fluid flow, and a second hollow conduit having an arcuate bent free end terminating substantially at the center of the flowing stream and an opening on it side closely adjacent said terminal end, said second hollow conduit communicating with said differential pressure-responsive means and the side opening providing the only communication between the interior of the impact probe and said differential pressure-responsive means.

3. The device as claimed in claim 2 and indicating means exterior of the pipe for positioning the probes in proper alignment within the pipe and including means indicating the relative position of said probes one to the other and to the pipe, said means for positioning the probes in proper alignment within the pipe comprising a flat surfaced bushing mounting said probes and including a pair of parallel flat-side surfaces, the probes being arranged to lie in a plane parallel to said surfaces whereby arrangement of said surfaces parallel to the pipe axis disposes the probes substantially on said axis, and said means for indicating the relative position of the probes one to the other and to the pipe comprising a bend in the impact probe disposed exterior of said pipe, said impact probe being rotatable independently of said static probe between an operative condition where the bend is in a plane parallel to the axis of the pipe and the inoperative condition more than 90° of rotation therefrom.

4. The device as claimed in claim 2 and a mounting assembly means including gate means, said probes being selectively reciprocable within said mounting means to permit removal of the probes together from the flowing stream while fluid pressure is maintained in the pipe, said probes being returnable together while the pipe is under fluid pressure selectively permitting withdrawal of the pair of probes simultaneously when the pipe is under fluid pressure.

5. The device as claimed in claim 2 wherein said impact probe is removable and replaceable independently of said static probe.

6. The structure as claimed in claim 1 in which the impact probe comprises a first hollow conduit disposed in said pipe diametrically transverse of the normal flow of fluid in the pipe, said first hollow conduit having blind ends, one being said end contacting the opposite wall of the pipe, said first hollow conduit having said plurality of spaced lateral openings formed therein along the length thereof in that portion of the conduit within the pipe and facing the impact of the fluid flow, and a second hollow conduit providing the only communication between the interior of the impact probe and said differential pressure-responsive means, said second hollow conduit opening to the interior of said first hollow conduit at least at one point in said first hollow conduit where the interior pressure will produce substantially an average value in said second hollow conduit.

7. A flow-measuring device for use in connection with a pipe carrying a fluid, and said device comprising:
  A. an impact probe engaged with the pipe and said probe comprising:
    i. a first hollow conduit disposed entirely across the pipe interior transversely of the normal fluid flow in the pipe and normal to the axis of said pipe,
    ii. said first hollow conduit having two blind ends located substantially at diametrically opposite points,
    iii. a plurality of spaced lateral openings in said first conduit along the length thereof in that portion of the conduit within the pipe and providing communication between the pipe and the interior of said first conduit on the upstream side of said probe,
    iv. a second conduit disposed in the first conduit having an interior disposed blind end terminating substantially at the center of said pipe in an arcuate lip formation and having a side opening to the interior of said first conduit at the center of said pipe, and closely adjacent said lip, said side opening offering only communication from the interior of the probe to the exterior of the pipe,
  B. a static measuring probe engaged within the pipe and having a static opening disposed in the pipe and a passageway providing communication between said static opening and the exterior of the pipe, and
  C. said probes including means for connection of a differential pressure-responsive means between said second conduit and last mentioned passageway, said connection means located on the exterior of the pipe for measurement of a pressure due to fluid velocity.

8. The device as claimed in claim 7 and means installed on the pipe diametrically opposite to the impact probe for maintaining the position of said lateral openings relative to the flowing stream against disturbance by the fluid pressure within the pipe.

9. The device as claimed in claim 7 and a balancing member disposed within said first conduit and of a size and configuration sufficient to displace a volume interior of said first conduit substantially equal to the volume displaced by said second conduit.

10. The device as claimed in claim 7 and indicating means exterior of the pipe visually determinative of the operational relationship of said impact and static probes, means for positioning the probes within the pipe, said indicating means comprising a bend in the impact probe and the impact probe being rotatable between a measuring position in which the bend lies in a plane parallel to the axis of the pipe and an inoperative position in which the bend is more than 90° from said measuring position, and said means for positioning the probes within the pipe comprising a flat bushing having a pair of flat faces, said bushing mounting having at least said impact probe with the latter arranged parallel to the flat faces, the faces being arranged parallel to the pipe axis to place the probe normal to said pipe axis and indicia means carried by said bushing for indicating direction of fluid flow in the pipe.

11. A flow-measuring device for installation into a fluid flow-carrying system, said device comprising,
an impact probe arranged transversely to intercept the fluid flow stream,
static fluid pressure-sensing means having a static opening arranged communicating with the fluid flow stream at a location downstream of said impact probe, and
differential fluid pressure-responsive means located exterior of said flow stream communicating between said impact probe and said static fluid pressure-sensing means for measurement of fluid pressure differential quantity representative of fluid velocity,
said impact probe comprising inner and outer hollow conduits disposed one within the other, the outer hollow conduit having blind ends and a plurality of spaced lateral openings along the length thereof and operably disposed entirely across the fluid stream in installed condition of the impact probe, said inner conduit having a closed arcuate end and a side opening closely adjacent the said closed end interior of the outer conduit and an opposite end opening exterior of said flowing stream to offer the only communication between the impact probe and the differential pressure-responsive means, said lateral openings arranged to face upstream in operating condition of the impact probe, and being symmetrically arranged on opposite sides of the axis of the pipe, the said side opening being located substantially on the center of fluid flow of said pipe.

12. For use in a device for measuring the flow rate of a flowing stream of fluid in fluid carrier means, the device including an impact element insertable transversely of the flow stream of fluid facing said flow in operating condition of said measuring device and a static fluid pressure-sensing element having a static opening downstream of said impact element, differential pressure-responsive means and coupling means exterior of said fluid carrier means connecting the impact element and the static sensing element and the differential pressure-responsive means for measurement of a differential pressure quantity representative of flow velocity: the invention comprising, the impact probe being formed of inner and outer hollow tubes, said outer tube having a plurality of spaced lateral openings arranged along the length thereof for placement at predetermined locations relative to the flow stream in installed condition of said measuring device, said outer tube having opposite blind ends, one end having a tapered terminal portion arranged with its apex engaging the inner wall of the fluid carrier means diametrically opposite the point of entry of the impact element into said carrier means and said inner hollow tube disposed within the outer tube and having a closed end terminating substantially at the center of the flowing stream in installed condition of said impact element, said inner tube having a side opening closely adjacent said terminal portion, the opposite end of said inner tube communicating with said coupling means to afford the only communication between the interior of the impact element and the differential pressure-responsive means.

13. A flow-measuring device for use in connection with a pipe carrying a fluid and said device comprising an impact probe engaged within the pipe transverse of the fluid flow therein and a static probe engaged within the pipe downstream of the impact probe and having a static opening disposed within said pipe, means enabling communication between the static opening and the exterior of the pipe through said static probe and differential responsive means communicatively coupled between said impact and static probes, said impact probe having a plurality of spaced lateral openings along the length thereof for disposition at predetermined locations across the pipe interior facing the fluid flow in operating condition of the impact probe, said impact probe having one end of tapered configuration, the apex thereof engaging the inner portion of the carrier wall diametrically opposite the point of entry of the probe thereinto.

14. The flow-measuring device as claimed in claim 13 in which said impact probe has opposite blind ends and an inner tube terminating interior of the impact probe at a location substantially at the center of the fluid flow interior of the pipe in installed condition of the device, said terminating end being closed except for a side opening formed immediately adjacent said end, the opposite end of said inner tube being communicatively coupled to the differential pressure-responsive means to afford the only communication between the interior of the impact probe and said differential pressure-responsive means.

15. A flow-measuring device for use in connection with a pipe of predetermined diameter carrying a fluid and said device comprising:
  i. a plug adapted to be inserted into a wall of said pipe,
  ii. an impact probe sealingly and slidably mounted in said plug and having an exterior end adapted to be disposed on the interior of the pipe and moved into engagement with the inner wall of the pipe opposite said plug, said impact probe having inner and outer hollow conduits, the outer conduit having a plurality of lateral impact openings adapted to face upstream and symmetrically spaced on opposite sides of the axis of said pipe when the said exterior end is so engaged against the said opposite pipe wall, the outer conduit having blind interior ends, the inner conduit terminating in an opening at substantially the axis of the pipe when the said exterior end is so engaged against the said opposite pipe wall and providing the only pressure-transmitting channel from the interior of said probe to the exterior of said plug,
  iii. a static probe also mounted in said plug downstream of the impact probe,
  iv. means for connection of differential pressure-responsive apparatus between said probes on the exterior of said plug, said probes having a fixed axial spaced alignment one relative to the other and the pipe when the plug is installed in said pipe, said impact probe being independently rotatable relative to said plug and the static probe.

16. A device as claimed in claim 15 in which the opening of the inner conduit is a side opening.

186,108

PO-1050
(5/69)

UNITED STATES PATENT OFFICE
CERTIFICATE OF CORRECTION

Patent No. 3,581,565          Dated    June 1, 1971

Inventor(s) PETER D. DIETERICH

It is certified that error appears in the above-identified patent and that said Letters Patent are hereby corrected as shown below:

Column 4, line 49, change "form" to --from--; column 7, line 41, after "alignment" insert a period --.--; column 9, line 22, after "409" insert --is formed in housing 408 normal to the axis of passage 407. A gate 406 is reciprocable in said passage 409--; column 9, line 68, after "installation" change the comma (,) to a period --.--.

Signed and sealed this 28th day of December 1971.

(SEAL)
Attest:

EDWARD M. FLETCHER, JR.      ROBERT GOTTSCHALK
Attesting Officer              Acting Commissioner of Patents